United States Patent [19]

Losee et al.

[11] 4,150,479
[45] Apr. 24, 1979

[54] METHOD OF MAKING MAGNETIC HEAD CORES WITH CANT ANGLES

[75] Inventors: Paul D. Losee, Longmont; Neil L. Robinson, Boulder, both of Colo.

[73] Assignee: International Business Machines Corporation, Armonk, N.Y.

[21] Appl. No.: 897,887

[22] Filed: Apr. 19, 1978

Related U.S. Application Data

[63] Continuation of Ser. No. 799,637, May 23, 1977, abandoned.

[51] Int. Cl.² ............................................... G11B 5/42
[52] U.S. Cl. ........................................ 29/603; 51/38; 51/92 ND; 51/327; 360/122; 360/125
[58] Field of Search ................. 29/603; 51/327, 92 R, 51/92 ND, 38; 360/122, 125, 127

[56] References Cited

U.S. PATENT DOCUMENTS

| | | | |
|---|---|---|---|
| 2,183,699 | 12/1939 | Schweiker | 51/92 R X |
| 3,624,897 | 12/1971 | Reade et al. | 29/603 |
| 3,810,245 | 5/1974 | Ozawa et al. | 29/603 |
| 3,903,545 | 9/1975 | Beecroft et al. | 360/125 X |

FOREIGN PATENT DOCUMENTS 181976  5/1955  Austria ..................................... 29/603

Primary Examiner—Carl E. Hall
Attorney, Agent, or Firm—Joscelyn G. Cockburn; James A. Pershon

[57] ABSTRACT

A method for batch fabricating magnetic heads with a desired cant angle in the transducing surface of the magnetic core. The cant angle reduces the "Minor Bit" phenomenon. The two parts of the core which require the cant angle are mounted on a fixture so that a grind wheel is simultaneously in contact with both parts. Materials are simultaneously subtracted (i.e., grind away) from both parts to create mirror images at the surfaces which adjoin the grind wheel. The surfaces are then cleaned and glassed to provide a core bar with intimate fit. The core bar is diced into individual cores and is lapped to size. The individual cores are then fitted into a slider assembly to form the magnetic head.

13 Claims, 11 Drawing Figures

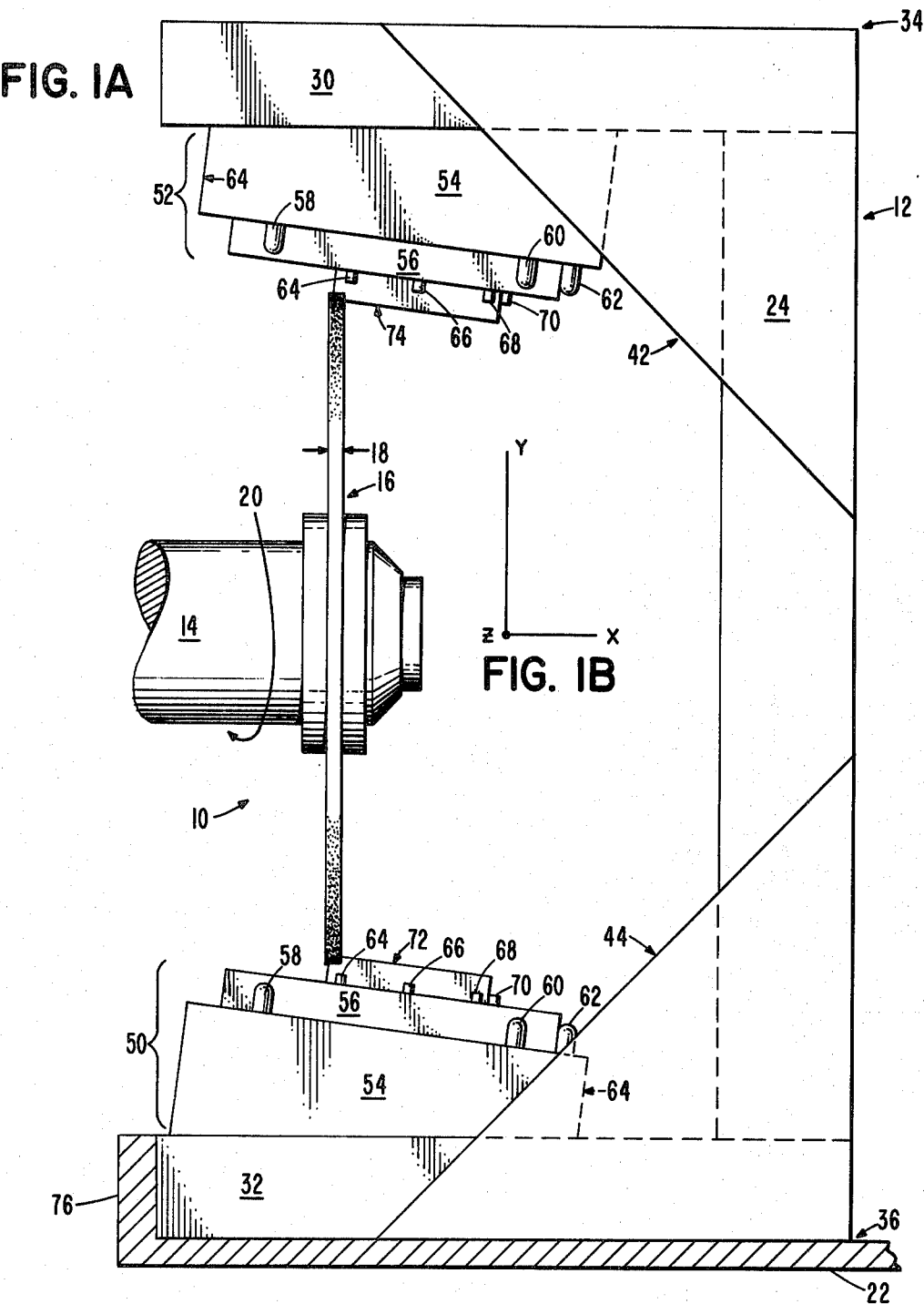

METHOD OF MAKING MAGNETIC HEAD CORES WITH CANT ANGLES

This is a continuation of application Ser. No. 799,637 filed May 23, 1977, now abandoned.

CROSS REFERENCES TO RELATED APPLICATIONS

This application is related to application Ser. No. 782,266, filed March 28, 1977, and is now pending.

BACKGROUND OF THE INVENTION

1. Field of the Invention

The invention relates to a method for batch fabricating magnetic heads with cant angles.

2. Description of the Prior Art

The use of magnetic heads for recording and reproducing information on a recording media is well known and has become more important in recent years. Although the magnetic recording media may take a plurality of different forms, e.g., disc (flexible and/or solid) tape, etc., there are only few characteristics which are necessary to identify such medias. Generally, a slurry in which magnetic particles are suspended is uniformly spread over a thin supporting structure. The structure is then cured to form the recording media.

When a magnetic field, which is created by a magnetic head, etc., is passed relative to the surface of the recording media, the suspended magnetic particles are aligned in accordance with the applied magnetic field to store data. In order to recover or reproduce the stored data, a magnetic head is positioned relative to the media and by cutting the magnetic flux lines the recorded data is reproduced.

In order to store and/or retrieve the magnetic data, in an orderly manner, the magnetic media is generally divided into data zones and servo zones. The data zones are the areas in which data is recorded, while the servo zones are the areas in which track following servo information is recorded.

For reproducing the recorded signal the magnetic head is passed relative to the media so as to traverse both data and servo zones. One problem associated with this system is that as the magnetic head traverses the media, spurious readback signals are generated as isolated magnetic transitions. The spurious readback signals are outputted with the signal envelope which contains the useful data to be recovered. These spurious signals, hereinafter called "minor bit," present problems for the read circuits which process the reproduced signals. In fact, whenever the problem occurs in the servo zone, whole data cartridges are sometimes rejected as being defective when, in fact, these data cartridges are good. The net result is that system output is significantly reduced.

The source of the minor bit problem is that in addition to the head gap which does normal reading, the edges of the head core and/or a nonactivated gap in a dual gap head also reads and outputs spurious signal envelope. Several approaches have been practiced in the prior art to solve the minor bit problem, none of which is altogether acceptable. For example, in one attempt the prior art uses filters to filter out the unwanted signal from the reproduced signal envelope. Although this method works satisfactorily it tends to increase system cost since the readback circuits with filters are more complex than if the filtering function is not used. Also, in the situation where the minor bit is mainly associated with the servo zone of the recording media, the filtering circuit has minimal use; since the filtering circuit is only operable for a relatively short period of time when the magnetic head is traversing the servo zone.

In still another attempt, the prior art uses shielding to solve the minor bit problem. However, shielding tends to increase head cost and also the complexity of the head. Also, shielding does not solve the minor bit problem in all cases. For example, when the nonactivated gap of a dual gap head is reading servo data as the head traverses the servo zone.

SUMMARY OF THE INVENTION

The present invention provides a method for manufacturing a magnetic head with cant angle or angles in the transducing surface (i.e., the surface which interfaces the magnetic media) of the core. By fabricating one or more cant angles in the transducer interface of the magnetic head the effect of the minor bit problem is eliminated. A mirror image having a stepped pattern characteristic of the cant angle is fabricated on the surfaces of the cores between which the cant angle is formed. Coil windows are then fabricated into one of the cores. The stepped surfaces are then cleaned and glassed together to form a bonded structure. The bonded structure is called the relief assembly.

A profile assembly including two half cores, one of which has a second coil window, is fabricated. The profile assembly and the relief assembly are glassed together to define a transducing gap therebetween and to form a core bar. The core bar is then diced into individual cores and lapped to size. The core bar is then fitted into a slide assembly to form a magnetic transducer.

In one feature of the invention the stepped surfaces are covered with a layer of diamond abrasive. By rubbing the surfaces together the diamond abrasive erodes and smoothens the corners of the stepped pattern to provide an intimate fit.

In still another feature of the invention two sets of coil windows are fabricated in the relief assembly and the profile assembly. The relief assembly and the profile assembly are then glassed together to form a core sandwich. The core sandwich is then cut to form two core bars from which individual cores are diced.

The stepped surfaces with mirror images are fabricated by mounting two pieces of materials (for example, two pieces of ferrite or one piece of ferrite and one piece of nonmagnetic material) on the mounting platforms of a fixture. The mounting platforms are inclined at an angle which is substantially equivalent to the angle of cant and are positioned in spaced alignment with respect to each other. The fixture is then seated on the horizontal bed or work table of a hydraulic surface grinder or similar tool room machine. The hydraulic surface grinder has a wheel spindle which has motion in at least two directions, each of which are mutually perpendicular and are also perpendicular to the direction of motion of the horizontal work table. A suitable cutting wheel is mounted on the wheel spindle and is so positioned that its cutting edges are in contact simultaneously with the two pieces of materials which are mounted on the mounting platforms.

By indexing the cutting wheel a predetermined distance along the two directions of motion and by transporting the work table a predetermined distance along its direction of motion a plurality of small steps are simultaneously machined into each of the pieces of material so that the machined surfaces are a replica of each other. The machined surfaces are then treated to form magnetic transducers.

The foregoing and other features and advantages of the invention will be apparent from the following more particular description of preferred embodiments of the invention, as illustrated in the accompanying drawings.

BRIEF DESCRIPTION OF THE DRAWINGS

FIGS. 1A, 1B, 1C and 1D show the fixture and hydraulic surface grinder which operate to fabricate mirror images on the mating surfaces of two pieces of materials.

DETAILED DESCRIPTION OF THE PREFERRED EMBODIMENT

Figure 1D:
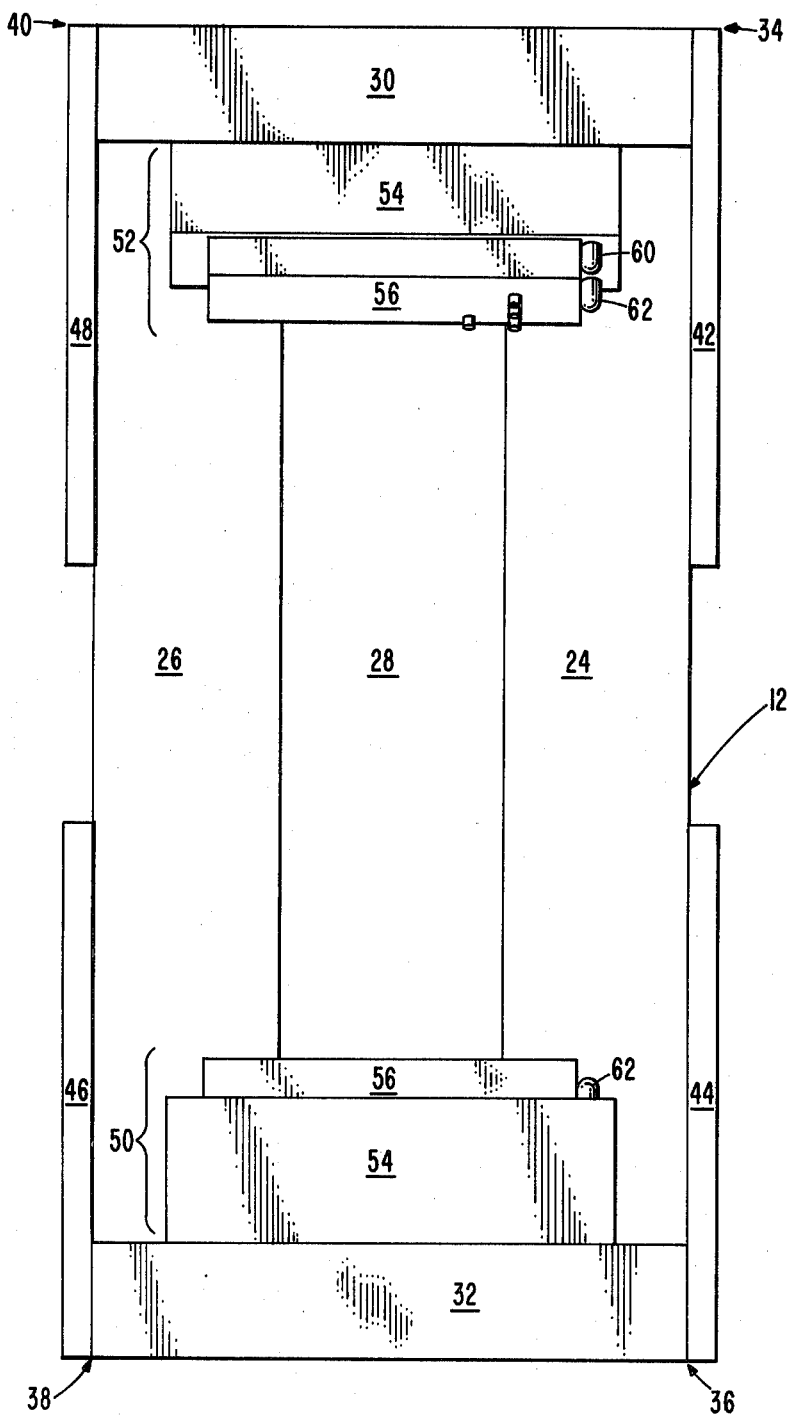

Referring now to the drawings, and more particularly FIGS. 1A, 1B, 1C, 2 and 3, there is provided cutting apparatus 10 and work fixture 12. The cutting apparatus and work fixture operate to generate cant angles in a mass production process for magnetic heads. In order to fabricate the cant angle on a mass production basis, mirror images which are characteristics of the cant angle are fabricated simultaneously on two pieces of work members between which the cant angle will be fabricated. Although it is within the skill of the art to use different types of material to fabricate the core of a magnetic transducer which embodies the cant angle, in the preferred embodiment of this invention the cant angle is generated between a magnetic material, for example ferrite, and a nonmagnetic material, for example berrium titanate ceramic hereinafter called BTC. It is worthwhile noting at this point that the process to be described hereinafter is applicable to generate mirror images on two pieces of material which may not necessarily be used for constructing magnetic heads.

Referring again to FIG. 1A, the cutting apparatus only the relevant part of which is shown, includes a wheel spindle 14. Seated on wheel spindle 14 is cutting wheel 16. Although the cutting wheel may be fabricated from various types of material, in the preferred embodiment of this invention the cutting wheel is fabricated from copper impregnated with diamond particles. The wheel's kurf width 18 is substantially equivalent to the width W (FIG. 8) of the magnetic head core. The importance of this relationship will be appreciated as the invention is unfolded in the following description. Still referring to FIG. 1A, wheel spindle 14 has rotational motion in the direction shown by arrow 20. As a result of the rotational motion, cutting wheel 16 is able to cut a desired pattern of grooves in the work pieces which are positioned about its periphery. In addition to the rotational motion, the wheel spindle has translational motion along the X and along the Y coordinate (FIG. 1B). By means of the translational motion the depth and width of each groove or cut which is fabricated in the work piece is controlled. In order to monitor the translational motion of wheel spindle 14 a digital counter (not shown) is connected to the wheel spindle. Of course other types of monitoring means can be fabricated by one skilled in the art.

As will be explained subsequently, in addition to controlling the depth and width of each groove or cut the angle of cut is also controlled. It is the ability to simultaneously control the listed characteristics (i.e., depth, width, and angle) of each cut that allows the generation of mirror pattern or image on the surfaces of the work pieces.

In addition to the wheel spindle with its cutting wheel, the cutting apparatus includes work table 22. The work table is substantially L-shaped and is used for positioning the work pieces which will be cut by the wheel spindle cutting wheel assembly of the cutting apparatus. The work table has translational motion along the Z direction (see FIG. 1B). As is evident from FIG. 1B, the Z direction is in and out of the page. By allowing the work table of the cutting apparatus to have translation motion along the Z direction (that is, in and out of the page) a groove having a desired angle, depth, and width is fabricated along the entire length of selected work pieces. It is worthwhile noting that the length of the cut is achieved by the Z motion of the work table. The cutting apparatus, only the relevant portion of which is shown in FIG. 1, is sometimes referred to in the literature as a surface grinder. Of course other names are used to describe the machine. A more detailed description of the type of surface grinder which is similar to that shown in FIG. 1A is described in *Machine Tools for Engineers*, pages 216–218. It should also be noted that the schematic in FIG. 1A is only a side view of the cutting apparatus.

Still referring to FIG. 1A, a side view of the work fixture 12 is shown with a front view shown in FIG. 1D. As was stated previously, the work fixture cooperates with the cutting apparatus to generate cuts or grooves on two pieces of work member which is positioned about the periphery of cutting wheel 16. When the combination (that is, cutting apparatus and fixture) is arranged as is shown in FIG. 1A, the cuts or grooves which are fabricated on the work piece are exact replicas of each other. The work fixture (FIGS. 1A, 1D) is an open sided, rectangular structure. The lengthwise portion of the fixture is defined by rectangular material 24 and 26, respectively. The rectangular materials are arranged to leave a void or blank space 28 in the back portion of the fixture. Rectangular pieces 24 and 26 are joined to rectangular sides 30 and 32 at corners 34, 36, 38 and 40, respectively. In order to add strength to the fixtures, four pieces of triangular metals 42, 44, 46 and 48 are arranged so as to tie the sides of the fixture to the length of the fixture. Seated on the sides of the work fixture are mounting platforms 50 and 52, respectively. Due to the fact that the mounting platforms are identical to each other, only one will be described hereinafter. The mounting platforms include seating blocks 54 and 56, respectively. The arrangement is such that seating block 56 is fixed on top of seating block 54 or vice versa. Locating pins 58, 60 and 62 are fabricated on seating block 54 and are functional for aligning the position of seating block 56 relative to seating block 54. Seating block 54 has a geometry which is substantially equivalent to a truncated triangle. The angle of the triangle which is removed and opposite to side 64 (FIG. 1A) is equivalent to the cant angle which is required in the transducing interface of the magnetic transducer. Although any desired cant angle can be fabricated in seating block 54, in the preferred embodiment of this invention the cant angle is between 6° and 38°. Still referring to FIG. 1A, locating pins 64, 66, 68 and 70 are seated on seating block 56 and are functional to align work piece 72 and 74 relative to one another. In the preferred embodiment of this invention, work piece 74 is a ferrite substrate, while work piece 72 is a nonmagnetic substrate; for example, ceramic or BTC.

In operation work fixture 12, with work pieces 72 and 74 seated on the seating platforms, is attached to work table 22. Work table 22 has a lever (not shown) which generates a magnetic field whenever it is thrown. This magnetic field attracts and holds work fixture 12 firmly. Work fixture 12 is seated so that the side 32 seats firmly against guide rail 76. The fixture with its work pieces are so seated that the cutting wheel 16 is in contact simultaneously with work pieces 72 and 74, respectively. In order to make the first cut or groove in the work piece the cutting apparatus is activated. This allows wheel spindle 14 with its cutting wheel to rotate in the direction shown by arrow 20. With the wheel rotating at full speed, the fixture is transported by work table 22 along the Z axis (see FIG. 1B). Stated another way, the work fixture and its attached work pieces are transferred in a direction in and out of the page. With the cutting wheel cutting the groove simultaneously in both work pieces, a first step pattern is generated on the work pieces. The motion of the work table in and out of the page enables the cutting wheel to cut the groove equivalent in length to the length of the work pieces. In order to make the second and subsequent cuts thereafter, the wheel spindle 14 must be moved over a desired distance along the X axis (FIG. 1B). In order to cut the groove a desired depth within the work piece, wheel spindle 14 must be translated a given distance along the Y axis. The FIG. 1C, to which we now turn, is helpful in explaining how the depth of each groove is determined.

Referring to FIG. 1C, "A" is defined as the distance along the X axis which the cutting wheel must be translated. As was stated previously, the distance "A" is equivalent to the wheel's kurf width 18. This wheel kurf width is equivalent to the width of the magnetic head core. "D" is the depth to which the cutting wheel must penetrate the work pieces. This "D" is taken along the Y axis. The tan $\theta$ is the angle of slant which is to be fabricated in the work pieces. Of course the angle is known. By well known geometric relationship tan $\theta$ is equal to "A" divided by "D" where "A" is equal to the opposite side of the triangle, while "D" is equal to the adjacent side. By cross multiplication, "D" is equal to A/Tan $\theta$. Hence, the penetration depth (D) is calculated. A digital counter (not shown) which is associated with the surface grinder of FIG. 1A monitors wheel spindle 14. This allows the operator to set the predetermined distances A and D, respectively. Once the first cut or groove is fabricated in the work piece the wheel spindle is indexed a distance A along the X axis and a depth D along the Y axis. The process is continued, that is, index, cut, index, until a mirror geometric pattern which is characteristic of the slant angle is fabricated in work piece 74 and 72, respectively.

Figure 2:
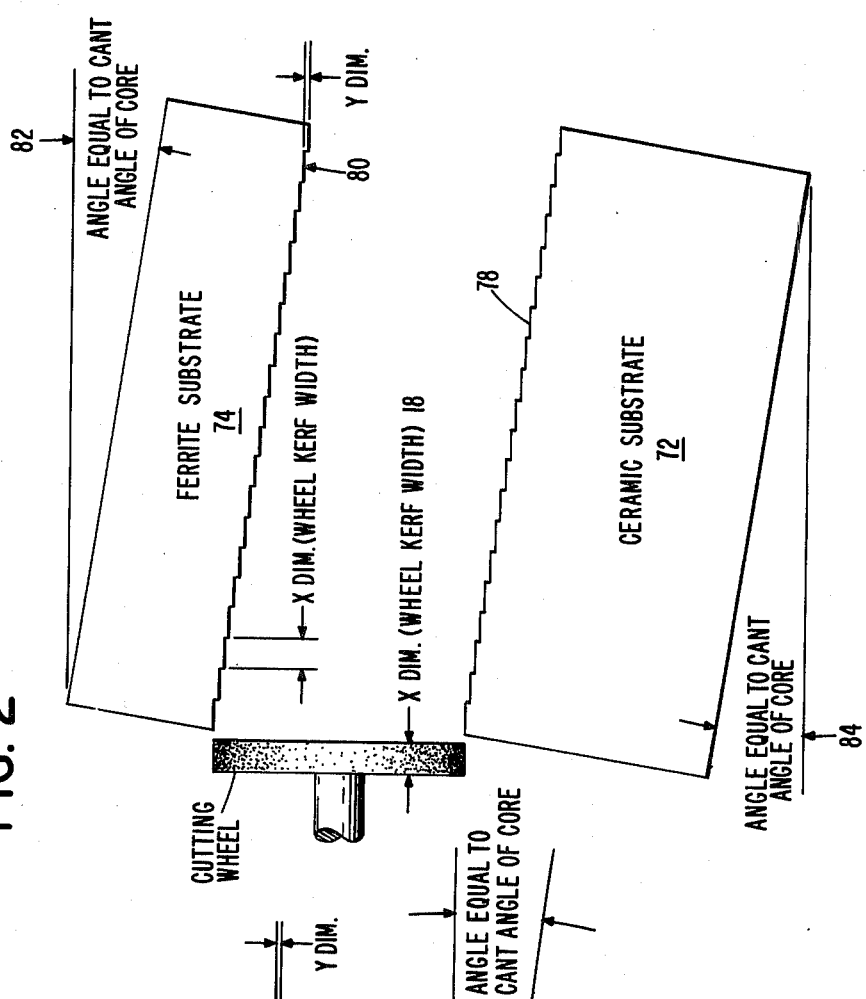
FIG. 2 shows the mirror images or stepped pattern which is produced by the grind wheel. The pieces are positioned at an angle which is equal to the cant angle.

Referring now to FIG. 2 a schematic of the combination of FIG. 1 is depicted. This schematic shows an end view of surfaces 78 and 80 after the step pattern is fabricated by the cutting wheel. As is evident from the schematic, the work pieces 72 and 74 each may be ferrite and/or ceramic substrate all held at an angle relative to the cutting wheel centerline. The angles 82 and 84 at which the pieces are held are substantially equivalent to the angle of cant which must be fabricated in the transducing interface of the magnetic transducer.

Figure 3:
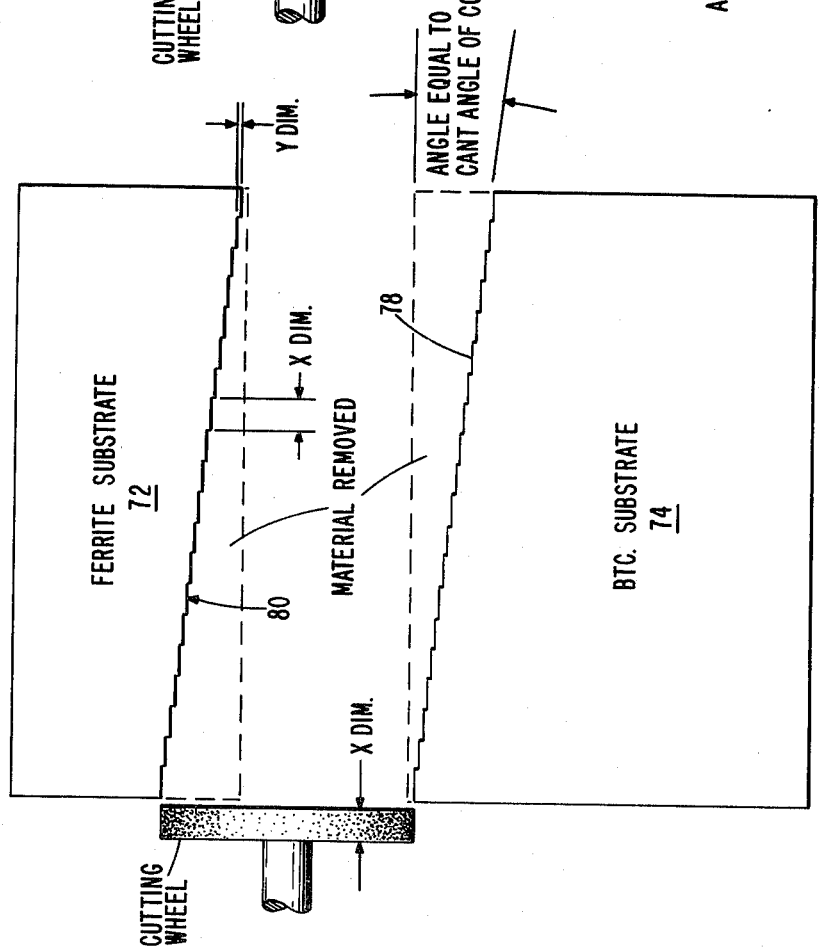
FIG. 3 depicts an alternative method of fabricating the mirror images. In contrast with FIG. 2, the pieces are held at right angles relative to the grind wheel.

FIG. 3 shows an alternative method for arranging work pieces 72 and 74, respectively, relative to the cutting wheel so as to generate mirror surfaces 78 and 80, respectively. As is evident from the figure, work piece 72 and 74 are held so that they are parallel with respect to the centerline of the cutting wheel.

Figure 5:
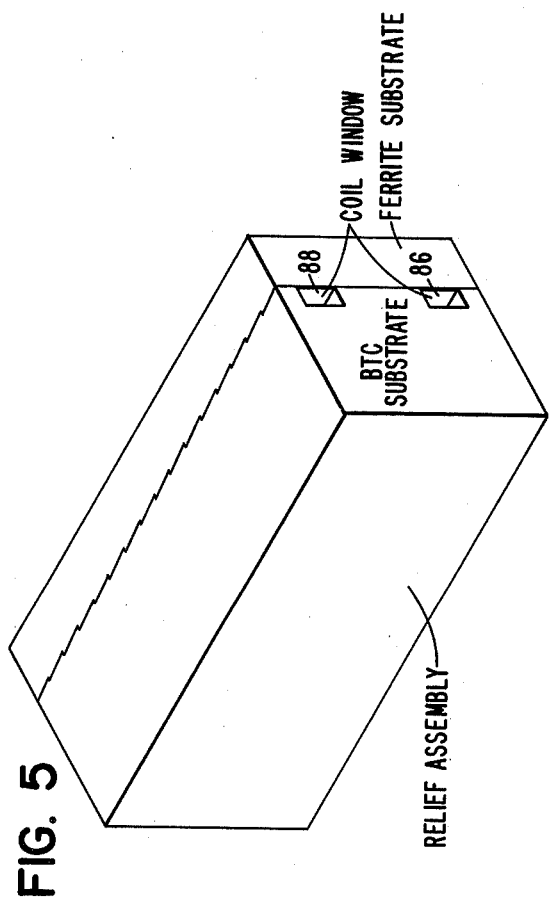
FIG. 5 shows a three-dimensional view of the relief assembly with coil windows of the composite structure of FIG. 4.
Figure 4:
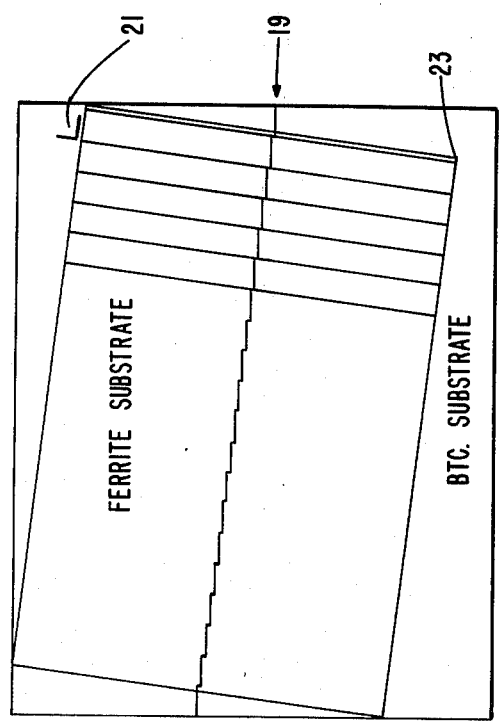
FIG. 4 is a side view of the composite structure which is formed by glassing (or otherwise bonding) the two pieces, derived from the alternative method of FIG. 3, together.

Whenever this alternative method is used to fabricate the mirror surfaces on the work pieces then the steps shown in FIG. 4 are followed in order to fabricate the composite structure of FIG. 5. Essentially, the BTC substrate and ferrite substrate are joined, by adhesive means, at boundary line 19 to form a composite structure. The structure is then trimmed along lines 21 and 23, respectively. The lines 23 and 21 are inclined to line 19. The trimmed core is now ready for diceing.

Fabricating the Magnetic Transducer

Once the mirror pattern which is characteristic of the angle of slant is fabricated in the ferrite and BTC substrate coil windows 86 and 88 (FIG. 5) is fabricated into the BTC substrate. As will be explained subsequently, if a single core bar is to be fabricated then only one coil window is fabricated in the BTC substrate. Although the BTC and the ferrite substrate can be joined together at surfaces 78 and 80, hereinafter called mating surfaces, a grinding compound, for example diamond abrasive, is placed between the mating surfaces. By rubbing the parts together a smoother fit is achieved. This step also improves the integrity of the finish of the mating surfaces. The surfaces are then cleaned with a solvent and then joined together. The joining can be done by glass or any other suitable adhesive. A view of the joined parts is shown in FIG. 5.

FIG. 5 is a drawing showing a three-dimensional view of the composite structure which is achieved by glassing or otherwise bonding the BTC substrate and the ferrite substrate together. This composite structure is hereinafter called the relief assembly. The relief assembly forms one-half of the core assembly (see FIGS. 6 and 8) which is attached to the slider assembly to form the magnetic transducer. Of course, the cant angle which interfaces the magnetic media is fabricated in the relief assembly half of the core.

Figure 6:
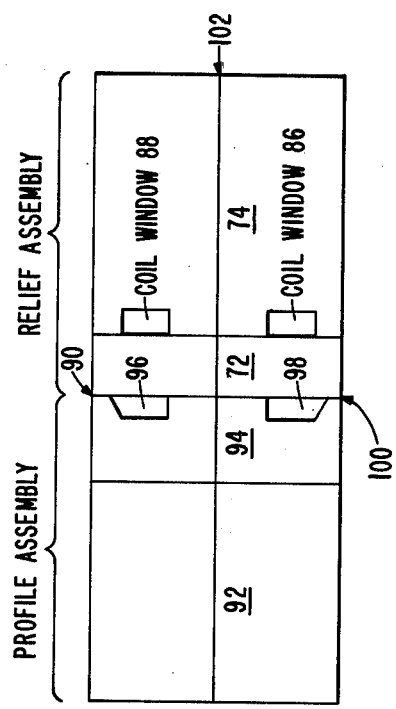
FIG. 6 shows an end view of the entire core assembly bonded together. When the core assembly is cut, two core bars are produced.

Referring now to FIG. 6, an end view of a dual core bar is shown. The dual core bar includes a relief assembly half and a profile assembly half. The relief assembly and the profile assembly are glassed together to define operation gap 90. As used herein the term 'operation gap' is a generic term which may be used to characterize an erase, write, and/or read gap. The fabrication of the relief assembly has already been described and will not be described in any greater detail. However, the profile assembly includes BTC substrate 92 which is glassed to ferrite substrate 94. Coil windows 96 and 98 are fabricated in ferrite substrate 94. As is evident from FIG. 6, when a coil (not shown) is wound on ferrite substrate 72 through coil windows 88 and 96, gap 90 can be activated. Similarly, when a second coil (not shown) is wound on ferrite substrate 72 through windows 98 and 86, operation gap 100 is activated. In order to form single core bars 11 from the dual core bar shown in FIG. 6, it is cut or sliced along line 102.

Figure 7:
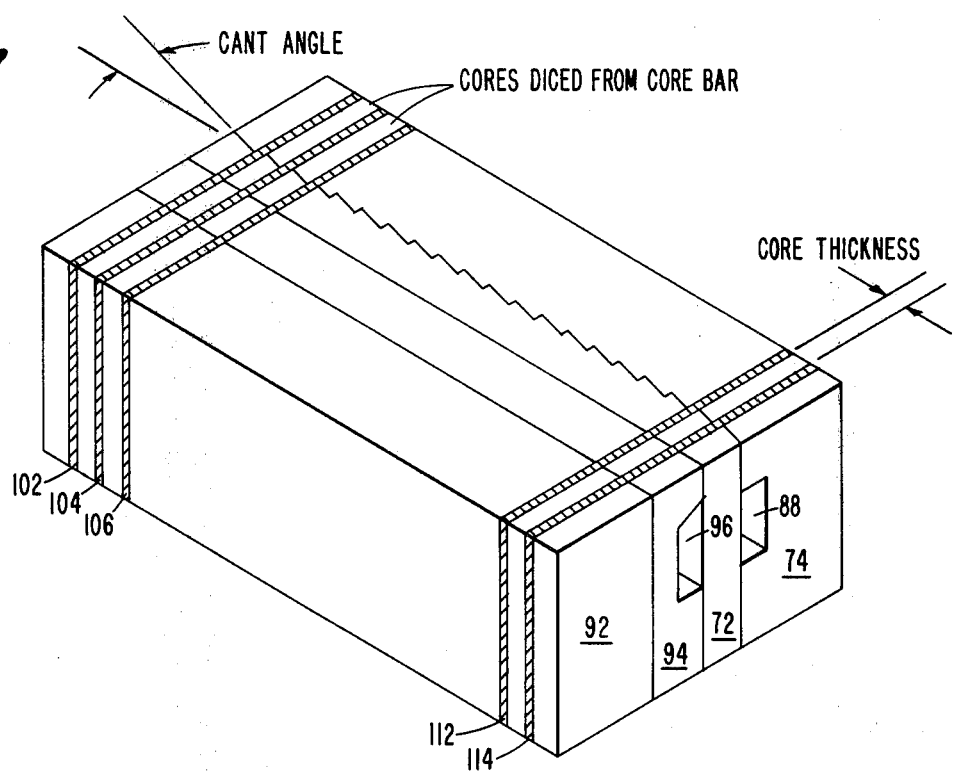
FIG. 7 is a three-dimensional view of one of the core bars derived from FIG. 6. The core bar is diced into individual cores along marked boundaries.

FIG. 7 shows a three-dimensional view of one of the core bars which is achieved from slicing in half the dual core bar of FIG. 6. The core bar is then diced or sliced along lines 102, 104, 106 . . . 112 and 114 to form individual cores. The individual cores are then lapped to achieve proper thickness or width.

Figure 8:
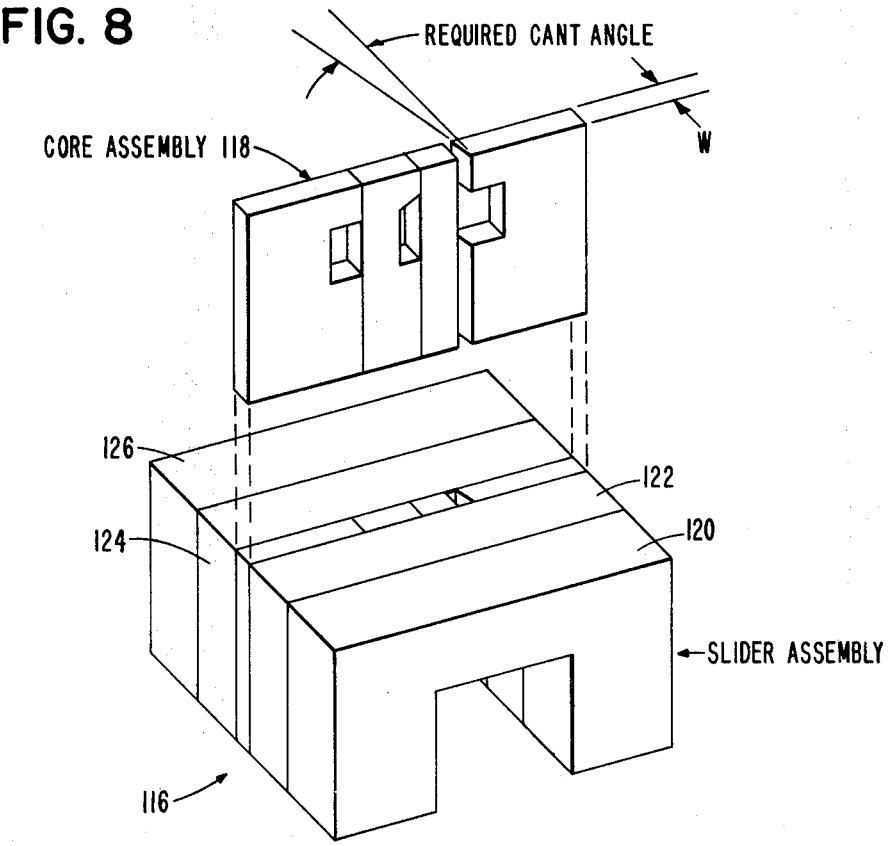
FIG. 8 depicts a magnetic transducer with cant angle. The transducer is fabricated in accordance with the teaching of the present invention.

FIG. 8 shows magnetic transducer 116 with core assembly 118 which is fabricated according to the teaching of the present invention. The core assembly 20 has a cant angle which is fabricated in the transducing surface of the magnetic transducer. The magnetic transducer includes the core assembly and a slider assembly. The slider assembly includes a magnetic material 120 which is glassed or otherwise joined to a nonmagnetic material 122. In the preferred embodiment of the invention, the magnetic material is ferrite while the nonmagnetic material is BTC. The other section of the slider assembly includes nonmagnetic material 124 and magnetic material 126. As before, in the preferred embodiment of this invention, the nonmagnetic material is BTC while the magnetic material is ferrite. Core assembly 118 is then glassed to the two sections of the slider assembly to form the composite structure which is the magnetic transducer. The surface of the magnetic transducer which interfaces the magnetic media is then ground to a specific geometric shape. In the preferred embodiment of the invention a spherical shape is positioned on the surface of the magnetic transducer.

Summary of the Process Steps

In summary, the following process steps are essential in order to batch fabricate magnetic transducers with cant angle:

1. Position the work pieces (for example, 72 and 74) about the cutting wheel (see FIGS. 1A, 2 and 3).
2. By indexing the cutting wheel in the "X" and "Y" direction, and transporting the work pieces in the "Z" direction for each cut with the cutting wheel a pattern of small steps is machined in each piece such that the surface machined (called mating surfaces) into the work pieces are exact replicas of each other.
3. Align the mating surfaces together with diamond abrasive between the surfaces.
4. Rub the surfaces together until the corners of the stepped pattern are eroded to provide an intimate fit.
5. Machine coil windows into one of the work pieces.
6. Clean and glass parts together (FIG. 4).
7. Assemble and glass the entire core assembly (FIG. 6).
8. Cut the core assembly in half to form core bars (FIGS. 6 and 7).
9. Dice the core bar into individual cores and lap to size (FIG. 7).
10. Assemble the individual cores into a slider assembly to form a magnetic transducer (FIG. 8).
11. Lap or grind the surface of the magnetic transducer to form a desired geometry.

This completes the detailed description of the invention.

As a result of the above teaching, all high temperature glass is used in the core assembly. Stated another way, high temperature glass is used for glassing the individual sections of the core.

All joints in the core assembly are inspected for voids before the core assembly is fitted into the slider assembly to form the magnetic transducer.

The cant angle joint on the core which interfaces the magnetic media is done in a batch fabricated technology. This approach reduces the overall cost of the magnetic head which is fabricated with a cant angle.

While the invention has been particularly shown and described with reference to the preferred embodiment thereof, it will be understood by those skilled in the art that various changes in form and details may be made therein without departing from the spirit and scope of the invention.

I claim:

1. A method for batch making magnetic heads for reading and writing of digital signals stored on a magnetic surface, said magnetic heads having core pieces with cant angle interfacing the magnetic media, comprising the steps of forming the cant angle between the core pieces by:
   1. subjecting the core pieces to a process to generate mating surfaces having a stepped surface profile on each core piece; each of said stepped surface profiles being characteristic of the cant angle and an exact replica of each other;
   2. generating a coil window in at least one of the core pieces;
   3. aligning the mating surfaces and joining the same with an adhesive to form a first composite structure;
   4. generating a core bar by aligning the first composite structure with a second composite structure and joining both structures by an adhesive to define an operation gap therebetween;
   5. dicing the core bar into individual cores; and
   6. positioning one of the individual cores into a slider assembly to form the magnetic head.

2. The method claimed in claim 1 further including the step of grinding the magnetic head so as to define a desired geometry on the surface interfacing the magnetic surface.

3. The method claimed in claim 2 wherein the desired geometry is spherical.

4. The method claimed in claim 1 further including the steps of:
   covering the mating surfaces with a lapping compound; and
   rubbing the mating surfaces together until the surfaces are eroded to provide an intimate fit.

5. The method claimed in claim 1 where the lapping compound is a diamond abrasive.

6. The method claimed in claim 1 wherein the process is a mechanical process including the steps of:
   1. positioning the core pieces so as to straddle a cutting wheel; said cutting wheel having the cutting edges in contact simultaneously with the core pieces;
   2. activating the cutting wheel;

3. transporting the core pieces past the cutting wheel so as to generate a first mirror stepped pattern along the length of the core pieces;
4. indexing the cutting wheel a predetermined distance along the core pieces;
5. indexing the cutting wheel so as to penetrate the core pieces a predetermined depth;
6. transporting the core pieces past the cutting wheel; and
7. repeating steps 4 through 6 across the width of the core pieces so that the surfaces which are being machined in the core pieces are exact replicas of each other.

7. The method claimed in claim 6 wherein the core pieces are being positioned at an angle about the cutting wheel; said angle being substantially equivalent to the cant angle.

8. The method claimed in claim 7 where the kurf width of the cutting wheel is substantially equivalent to the width of the individual cores.

9. The method claimed in claim 6 where the cutting wheel is being indexed along the width of the core pieces a predetermined distance substantially equivalent to the kurf width of the wheel.

10. The method claimed in claim 6 where the penetration depth (D) is substantially equivalent to $D = W \tan \theta$ where $\theta$ is the angle of cant and W is the kurf width of the cutting wheel.

11. The method claimed in claim 10 where $\theta$ is from 6° to 38°.

12. A method for batch fabricating magnetic transducers with cant angles comprising in combination:
fabricating mirror images on mating surfaces of at least two core pieces; said mating surfaces having a geometric pattern substantially characteristic of the cant angles;
positioning coil windows in at least one of the core pieces;
joining said core pieces along the mating surfaces to form the first half of a core assembly;
fabricating the second half of the core assembly;
joining the first and the second half of the core assembly so as to define an operation gap therebetween; and to form a core bar; and
dicing the core bar into individual cores.

13. The method claimed in claim 12 wherein the second half of the core bar is fabricated with coil windows therein.

* * * * *